United States Patent
Yu

(10) Patent No.: US 9,126,840 B2
(45) Date of Patent: Sep. 8, 2015

(54) THIOETHER-BRIDGED ORGANIC/INORGANIC COMPOSITE AND METHOD FOR PREPARING HOLLOW OR POROUS CARBON STRUCTURES AND SILICA STRUCTURES USING THE SAME

(71) Applicant: KOREA UNIVERSITY RESEARCH AND BUSINESS FOUNDATION, Seoul (KR)

(72) Inventor: Jong-Sung Yu, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 114 days.

(21) Appl. No.: 13/904,814

(22) Filed: May 29, 2013

(65) Prior Publication Data

US 2014/0356623 A1    Dec. 4, 2014

(51) Int. Cl.
*C01B 31/02* (2006.01)
*C01B 33/18* (2006.01)

(52) U.S. Cl.
CPC .................. *C01B 33/18* (2013.01); *C01B 31/02* (2013.01); *C01B 31/0293* (2013.01); *Y10T 428/2982* (2013.01)

(58) Field of Classification Search
CPC ...... C01B 33/18; C01B 31/02; C01B 31/0293
USPC .............................. 428/402; 216/99; 264/29.1
See application file for complete search history.

(56) References Cited

U.S. PATENT DOCUMENTS

| 7,256,231 | B2 * | 8/2007 | Lin et al. | 524/237 |
| 7,629,430 | B2 * | 12/2009 | Cruse | 528/30 |
| 2012/0115031 | A1 * | 5/2012 | Atanassova et al. | 429/228 |

FOREIGN PATENT DOCUMENTS

| JP | 2009-243852 | | 5/2011 |
| WO | WO2010/068067 | * | 6/2010 |
| WO | WO 2010/068067 A2 | | 6/2010 |

* cited by examiner

*Primary Examiner* — Leszek Kiliman
(74) *Attorney, Agent, or Firm* — Alston & Bird LLP

(57) ABSTRACT

Provided are organosilica composites based on bis(3-triethoxysilylpropyl)tetrasulfide (TESPTS) or bis(3-triethoxysilylpropyl)disulfide (TESPDS) and containing octadecyltrimethoxy silane ($C_{18}$TMS) and cetyltrimethylammonium bromide (CTAB), and a method for preparing hollow or porous carbon structures and silica structures using the same. According to the present disclosure, it is possible to obtain hollow or porous carbon structures and silica structures in a more simple and cost-efficient manner. Thus, the resultant structures have a high surface area and a large mesopore volume, so that they may serve as catalyst carriers for fuel cells capable of loading metal catalyst particles having a smaller particle size in a larger amount and in a more homogeneously dispersed state.

18 Claims, 11 Drawing Sheets

# THIOETHER-BRIDGED ORGANIC/INORGANIC COMPOSITE AND METHOD FOR PREPARING HOLLOW OR POROUS CARBON STRUCTURES AND SILICA STRUCTURES USING THE SAME

TECHNICAL FIELD

The following disclosure relates to preparation of thioether-bridged organic/inorganic composites, and a method for preparing hollow or porous carbon structures and silica structures using the same. More particularly, the following disclosure relates to preparation of organosilica composites based on bis(3-triethoxysilylpropyl)tetrasulfide (TESPTS) or bis(3-triethoxysilylpropyl)disulfide (TESPDS) and containing octadecyltrimethoxy silane ($C_{18}$TMS) and cetyltrimethylammonium bromide (CTAB), and a method for preparing hollow or porous carbon structures and silica structures using the same.

BACKGROUND

Since the first mesoporous silica known as M41S series was introduced by Mobil Oil Company in 1992, mesoporous silica alchemy was started. There have been reported many studies about preparation of mesoporous materials having different meso-phase types and morphologies through the use of a cationic, neutral or nonionic surfactant or surfactant mixture under basic, acidic and neutral conditions.

Developing inorganic/organic hybrid materials have been given many attentions, because it has been expected that organic and inorganic building blocks are assembled from a single material so that the advantages of both organic and inorganic materials are combined with each other. As compared to pure mesoporous silica or functional mesoporous silica having an organic group attached to the end thereof, periodical mesoporous organosilica (PMO) is characterized by its advantages of a periodical mesoporous silica material combined with those of a hybrid organic/inorganic material. A thioether functional group shows strong affinity to metal ions and imparts ideal functional sites to a mesoporous material as an efficient adsorbent for removing heavy metal ions from wastewater. Particularly, thioether groups may be oxidized into sulfonic acid groups functioning as acid catalysts which are given many attentions in the field of ordered mesoporous materials having a lot of disulfide groups loaded thereto. Bis(3-triethoxysilylpropyl)tetrasulfide (TESPTS) or bis(3-triethoxysilylpropyl)disulfide (TESPDS) is an organic silane having a propyl, ethoxy and sulfide groups. In addition, interaction between such organic silanes and silica has been demonstrated sufficiently. However, there are only a few studies about nanoporous materials containing a thioether moiety in their lattice structures.

In addition, as nanostructural functional materials have been spotlighted, it has been possible to produce high-quality mesoporous silica and carbonaceous materials in a large scale. However, there is still a need for developing a method for preparing nanostructural functional materials in a more simple and cost-efficient manner.

Meanwhile, the dynamic limit of oxygen reduction reaction (ORR) in an electrocatalyst is one of the most important issues in developing efficient proton exchange membrane fuel cells (PEMFC). Active studies have been conducted about various materials as catalyst carriers substituting for conventional carbon black (VC, Vulcan XC-72 Carbon) in order to improve electrocatalytical characteristics.

According to the related art, Japanese Laid-Open Patent Publication No. 2011-090911 discloses a core-shell structure carbon composite, which is prepared by using 4-{1-[2,4-dinitrophenyl]hydrazono}ethyl}benzene-1,3-diol as a structure-forming composite and is useful as a catalyst carrier for fuel cells. In addition, WO10/068,067 discloses core-shell structure carbon nanotubes useful as electrode materials for solar cells.

SUMMARY

An embodiment of the present disclosure is directed to preparing a thioether-bridged organic/inorganic composite and providing hollow or porous carbon structures and silica structures by using the thioether-bridged organic/inorganic composite in a more simple and cost-efficient manner.

Another embodiment of the present disclosure is directed to providing hollow or porous carbon structures and silica structures obtained by the method and having a high surface area and a large mesopore volume.

Still another embodiment of the present disclosure is directed to providing a catalyst carrier for fuel cells, which allows metal catalyst particles having a smaller particle size to be loaded in a larger amount and in a more homogeneously dispersed state.

In one general aspect, there is provided a method for preparing hollow carbon structures, including the steps of:
 (a) preparing spherical silica-carbon composites including bis(3-triethoxysilylpropyl)tetrasulfide (TESPTS) or bis (3-triethoxysilyl propyl)disulfide (TESPDS) and octadecyltrimethoxysilane ($C_{18}$TMS);
 (b) firing the spherical silica-carbon composites under nitrogen; and
 (c) after firing, selectively removing the silica particles with an etchant solution.

In another general aspect, there is provided a method for preparing spherical silica particles, including the steps of:
 (a) preparing spherical silica-carbon composites including bis(3-triethoxysilylpropyl)tetrasulfide (TESPTS) or bis (3-triethoxysilylpropyl)disulfide (TESPDS) and octadecyltrimethoxysilane ($C_{18}$TMS); and
 (b) firing the spherical silica-carbon composites in air.

According to an embodiment, in step (a), the spherical silica-carbon composites may be prepared by mixing bis(3-triethoxysilylpropyl)tetrasulfide or bis(3-triethoxysilylpropyl)disulfide and octadecyltrimethoxysilane with a co-solvent including water, ethanol and an alkaline additive, followed by agitation.

According to another embodiment, the alkaline additive may be aqueous ammonia having a concentration of 20-35 wt % based on the total weight of the mixed solution.

According to still another embodiment, the etchant solution may be 30-50% aqueous hydrofluoric acid (HF) solution or 1.0-4.0M aqueous NaOH solution.

In still another general aspect, there are provided hollow carbon structures obtained by the above-mentioned method, and an electrode for fuel cells including the same as a catalyst carrier. The hollow carbon structures include: a porous outer shell having a plurality of micropores and a plurality of mesopores; and a hollow core, wherein the hollow core is a macropore having a diameter of 30-700 nm, the micropores have a diameter of 0.4-2 nm, and the mesopores have a diameter of 2-10 nm.

In still another general aspect, there are provided spherical silica particles obtained by the above-mentioned method, and including a plurality of micropores and a plurality of mesopores, wherein the micropores have a diameter of 0.4-2 nm and the mesopores have a diameter of 2-40 nm.

In still another general aspect, there is provided a method for preparing spherical carbon particles, including the steps of:
  (a) preparing spherical silica-carbon composites including bis(3-triethoxysilylpropyl)tetrasulfide (TESPTS) or bis (3-triethoxysilylpropyl)disulfide (TESPDS) and cetyltrimethyl ammonium bromide (CTAB);
  (b) firing the spherical silica-carbon composites under nitrogen; and
  (c) after firing, selectively removing the silica particles with an etchant solution.

In another general aspect, there is provided a method for preparing hollow silica structures, including the steps of:
  (a) preparing spherical silica-carbon composites including bis(3-triethoxysilylpropyl)tetrasulfide (TESPTS) or bis (3-triethoxysilylpropyl)disulfide (TESPDS) and cetyltrimethylammonium bromide (CTAB); and
  (b) firing the spherical silica-carbon composites in air.

According to an embodiment, in step (a), the spherical silica-carbon composites may be prepared by mixing bis(3-triethoxysilylpropyl)tetrasulfide or bis(3-triethoxysilylpropyl)disulfide and cetyltrimethylammonium bromide with a co-solvent including water, ethanol and an alkaline additive, followed by agitation.

According to another embodiment, the alkaline additive may be aqueous ammonia having a concentration of 20-35 wt % based on the total weight of the mixed solution.

According to still another embodiment, the etchant solution may be 30-50% aqueous hydrofluoric acid (HF) solution or 1.0-4.0M aqueous NaOH solution.

In still another general aspect, there are provided spherical carbon particles obtained by the above-mentioned method, and including a plurality of micropores and a plurality of mesopores, wherein the micropores have a diameter of 0.4-2 nm, and the mesopores have a diameter of 2-40 nm.

In still another general aspect, there are provided hollow silica structures obtained by the above-mentioned method, and including: a porous outer shell comprising a plurality of micropores and a plurality of mesopores; and a hollow core, wherein the hollow core is a macropore having a diameter of 30-700 nm, the micropores have a diameter of 0.4-2 nm and the mesopores have a diameter of 2-10 nm.

According to the methods disclosed herein, it is possible to obtain hollow or porous carbon structures and silica structures in a more simple and cost-efficient manner. The resultant structures have a high surface area and a large mesopore volume, so that they may serve as catalyst carriers for fuel cells capable of loading metal catalyst particles having a smaller particle size in a larger amount and in a more homogeneously dispersed state. Further, the structures may be used in various industrial fields, including biology, drug or material release control, catalysts, chromatography, functional thin films for separation, dual-membrane storage batteries and secondary batteries, solar cells or sensor electrodes.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EMBODIMENTS

Figure 1:
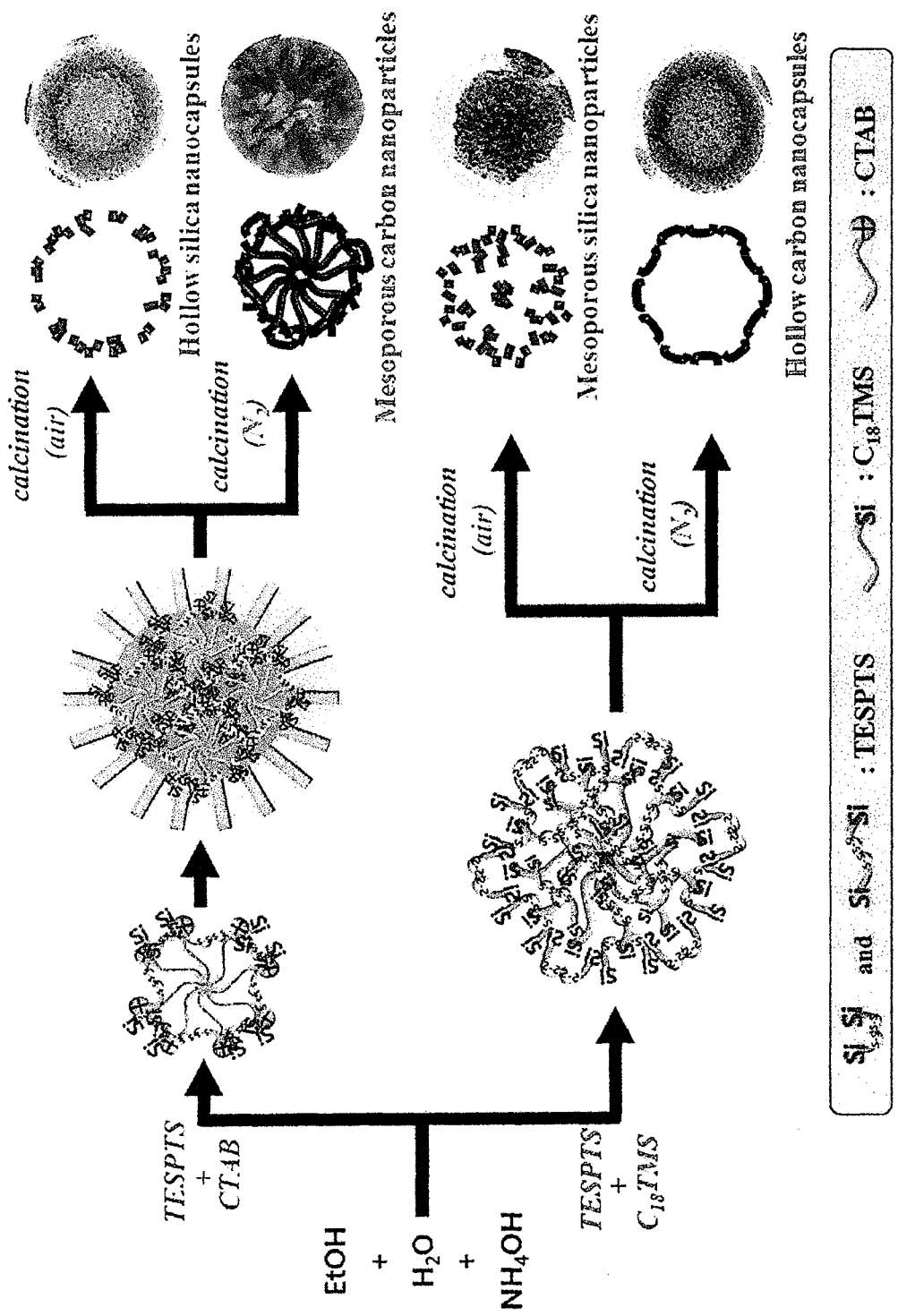
FIG. 1 is a schematic view illustrating a method for preparing various hollow or porous carbon structures and silica structures by carrying out self-assemblage between TESPTS or TESPDS and a structure-modifying agent (CTAB or $C_{18}$TMS), followed by firing, in accordance with an embodiment.

The advantages, features and aspects of the present disclosure will become apparent from the following description of the embodiments.

In one aspect, there are provided thioether-bridged organic/inorganic composite structures, and a method for preparing porous spherical silica or carbon particles and hollow silica or carbon structures using the same. The method disclosed herein includes: preparing organosilica nanostructured composites based on bis(3-triethoxysilylpropyl)tetrasulfide (TESPTS) or bis(3-triethoxysilylpropyl)disulfide (TESPDS) via a simple sol-gel reaction; and carrying out post-treatment to obtain various silica and carbon structures.

The hollow carbon structures obtained according to an embodiment may be used as a catalyst carrier for dispersion of platinum with high capacity. The resultant catalyst provides higher catalytic activity to oxygen reduction reaction as compared to a Pt catalyst supported on commercially available carbon black (Vulcan XC-72R). This is because the organosilica nanostructured composites based on bis(3-triethoxysilylpropyl)tetrasulfide or bis(3-triethoxysilylpropyl)disulfide as disclosed herein allows production of silica and carbon structures having a higher surface area and a larger mesopore volume, and particularly having a unique structure of a hollow macroporous core and a mesoporous shell. In other words, the catalyst carrier disclosed herein enables use of Pt nanoparticles having a smaller size and high-quality dispersion of Pt nanoparticles, and improves mass transfer.

Octadecyltrimethoxysilane ($C_{18}$TMS) or cetyltrimethylammonium bromide (CTAB) is used in combination with TESPTS or TESPDS and subjected to a sol-gel process to obtain uniform spheres in an alcoholic solution containing ammonia and water. The TESPTS-based or TESPDS-based nanostructures are nanostructured composite materials containing both an organic source and an inorganic source in their lattices, and may be used as multi-purpose precursors for various silica/carbon composite materials, and for direct structure modification of hollow and nanoporous silica and nanoporous silica or carbon structures.

The hollow and nanoporous silica or carbon structures may be obtained from TESPTS-based or TESPDS-based nanostructures by using different firing conditions. While hollow and porous silica is obtained by firing the silica/carbon composite materials in air, hollow carbon and porous carbon is obtained by carbonizing the organic moieties of the composite materials under nitrogen flow, followed by silica etching.

EXAMPLES

The examples and experiments will now be described. The following examples and experiments are for illustrative purposes only and not intended to limit the scope of this disclosure.

Example 1

Preparation of Monodisperse Thioether-Bridged Organosilica Structures (1) Monodisperse thioether-bridged organosilica spheres (TBOS) having a diameter of about 350 nm are prepared in an alcoholic solution via a sol-gel process. First, 30 mL of aqueous ammonia (28 wt %) is added to a mixed solution of 1000 mL of anhydrous ethanol and 100 mL of deionized (DI) water. After agitating the mixed solution for 30 minutes, 40 mL of bis(3-triethoxysilylpropyl)tetrasulfide (TESPTS) is added thereto, followed by agitation for 6 hours at room temperature, thereby providing monodisperse thioether-bridged organosilica spheres (TBOS).

(2) In a variant, monodisperse thioether-bridged organosilica spheres (TBOS) are obtained in the same manner as described above, except that bis(3-triethoxysilylpropyl)disulfide (TESPDS) is used instead of TESPTS.

Figure 2A:
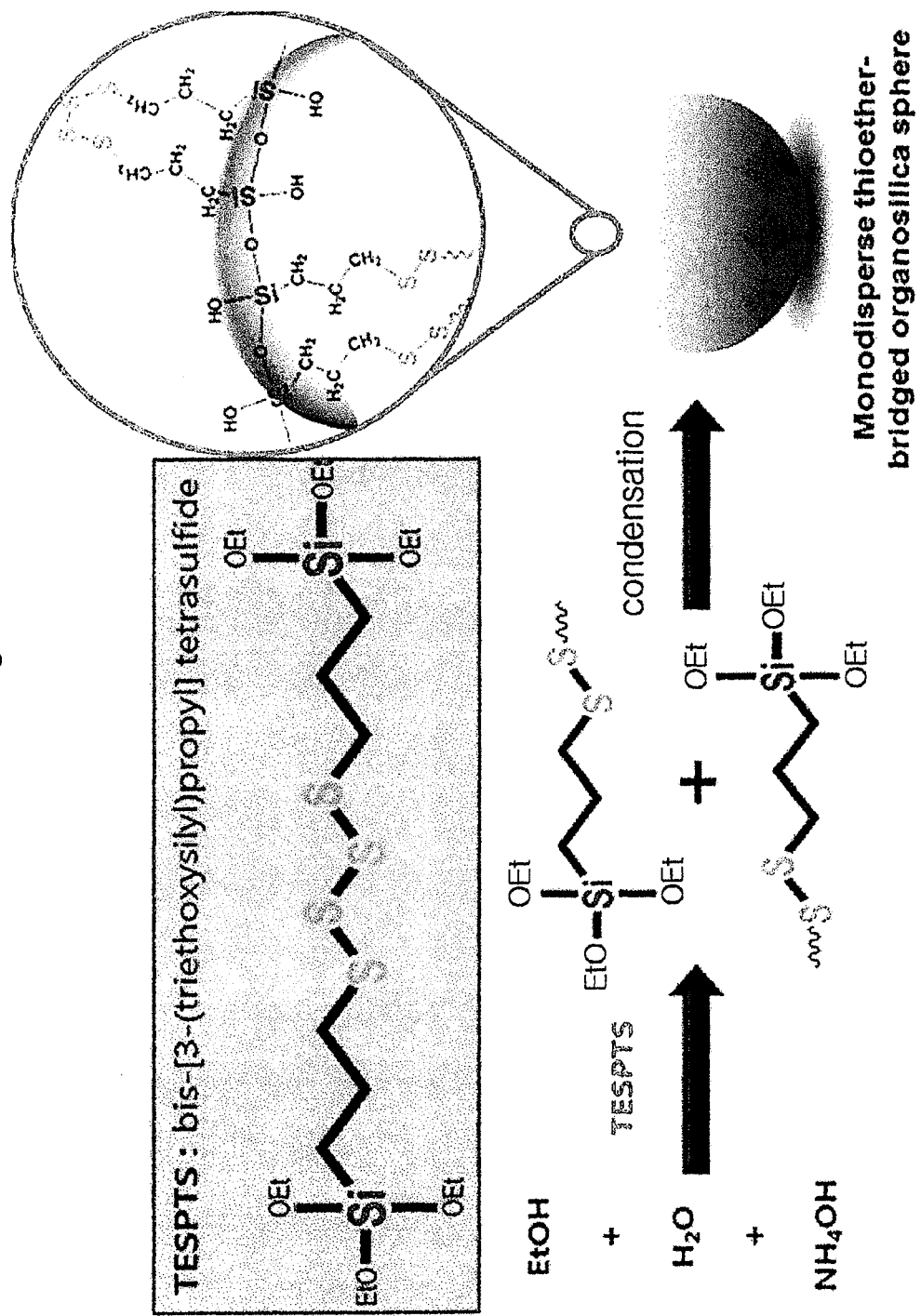
FIG. 2a is a schematic view illustrating a method for preparing monodisperse thioether-bridged organosilica spheres (TBOS)
Figure 2B:
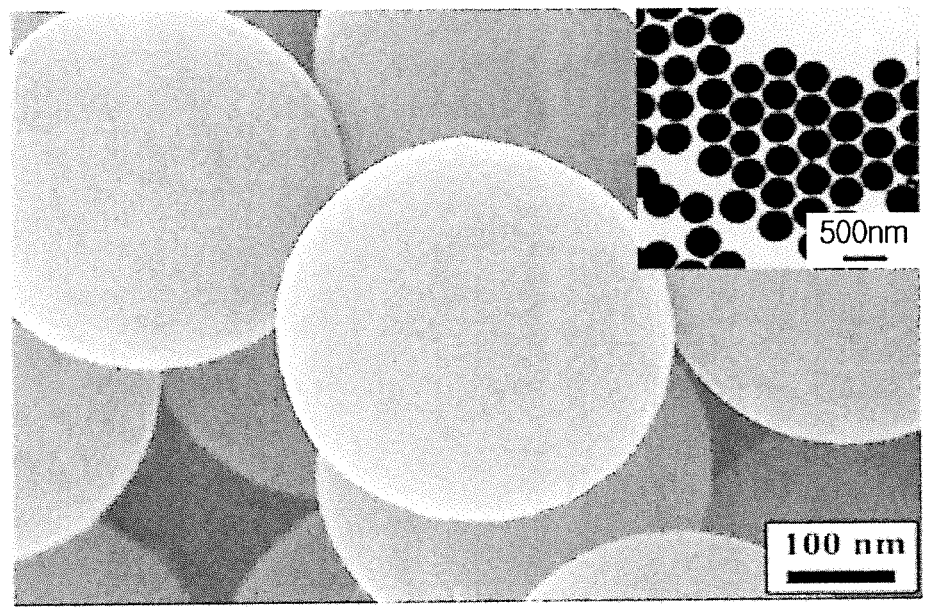
FIG. 2b shows scanning electron microscopy (SEM) and transmission electron microscopy (TEM) images of the monodisperse thioether-bridged organosilica spheres (TBOS) according to Example 1.
Figure 2C:
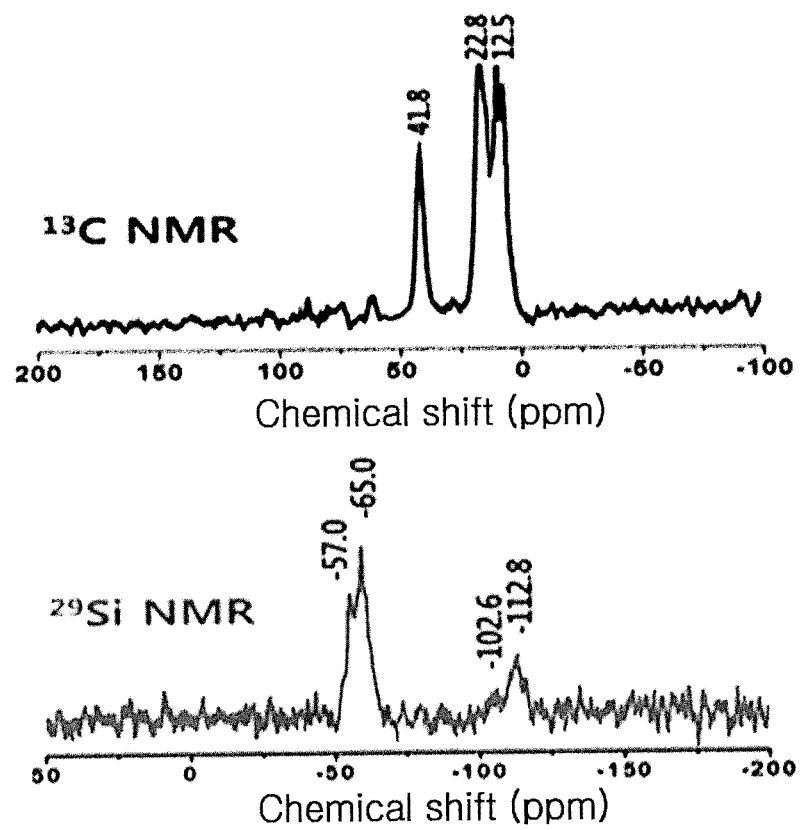
FIG. 2c shows $^{13}$C and $^{29}$Si magic angle spinning nuclear magnetic resonance (MAS NMR) spectra of the monodisperse thioether-bridged organosilica spheres (TBOS) according to Example 1.

FIG. 2a is a schematic view illustrating a method for preparing monodisperse thioether-bridged organosilica spheres (TBOS); and FIG. 2b shows scanning electron microscopy (SEM) and transmission electron microscopy (TEM) images of the monodisperse thioether-bridged organosilica spheres (TBOS) according to Example 1. In addition, FIG. 2c shows $^{13}C$ and $^{29}Si$ magic angle spinning nuclear magnetic resonance (MAS NMR) spectra of the monodisperse thioether-bridged organosilica spheres (TBOS) according to Example 1.

Example 2

Preparation of TESPTS (TESPDS)-Based Composite Nanostructures

To combine TESPTS or TESPDS with cetyltrimethylammonium bromide (CTAB), 5-10 mL of TESPTS or TESPDS and 1.2 g of CTAB are dissolved in a mixed solvent containing 20 mL of DI water and 10 mL of ethanol. The resultant solution is added promptly to the co-solvent solution obtained as described above and containing 300 mL of DI water, 100 mL of ethanol and 6 mL of aqueous ammonia (28 wt %) while agitating the mixture vigorously. After agitating the mixture for 12 hours, the solid product is recovered by centrifugal separation, and then dried overnight at 343K to obtain CTAB-TESPTS or CTAB-TESPDS composite nanostructures.

Figure 3A:
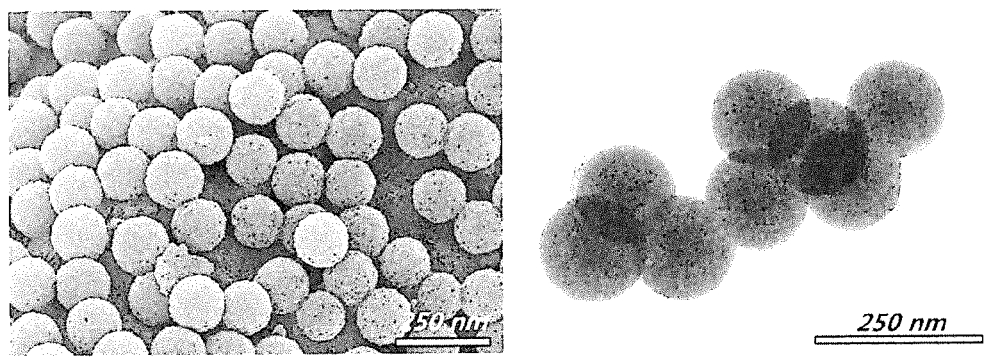
FIG. 3a shows TEM images illustrating the CTAB-TESPTS nanostructures obtained according to Example 2.

FIG. 3a shows TEM images illustrating the CTAB-TESPTS nanostructures obtained according to Example 2.

Example 2-(1)

Preparation of Nanostructured Hollow Silica Structures

The CTAB-TESPTS nanostructures obtained from Example 2 are fired in air at 823K for 6 hours to obtain nanostructured hollow silica structures. The resultant nanostructured hollow silica structures will be referred to also as CTAB-TESPTS-A hereinafter.

Figure 3B:
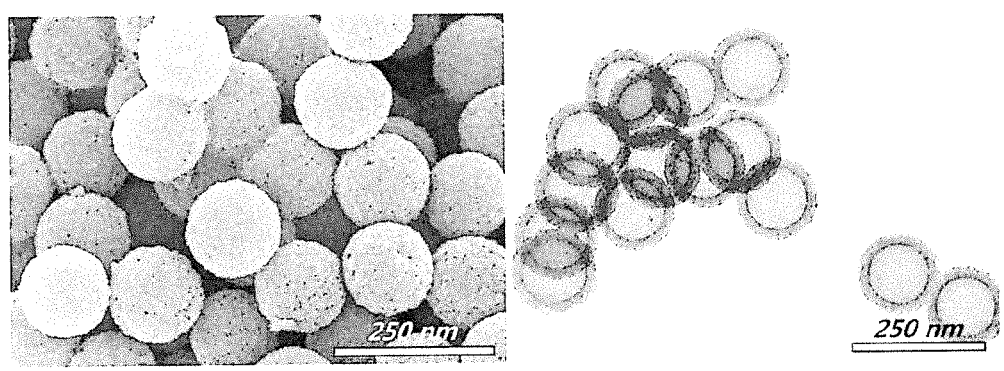
FIG. 3b shows TEM images illustrating the nanostructured hollow silica structures (CTAB-TESPTS-A) obtained by firing CTAB-TESPTS nanostructures in air according to Example 2-(1)

FIG. 3b shows TEM images illustrating the nanostructured hollow silica structures (CTAB-TESPTS-A) obtained by firing CTAB-TESPTS nanostructures in air according to Example 2-(1).

Example 2-(2)

Preparation of Nanostructured Hollow Spherical Carbon Particles

The CTAB-TESPTS nanostructures obtained from Example 2 are fired under nitrogen at 423K for 2 hours and at 1073K for 6 hours to obtain porous spherical carbon/silica composites. Then, silica is removed selectively therefrom by using 48% aqueous HF or 2.0M aqueous NaOH solution to obtain nanostructured porous spherical carbon particles. The resultant spherical carbon/silica composites will be referred to also as CTAB-TESPTS-N (fired under nitrogen) and as CTAB-TESPTS-NF (fired under nitrogen and etched with HF or 2.0M NaOH), hereinafter.

Figure 3C:
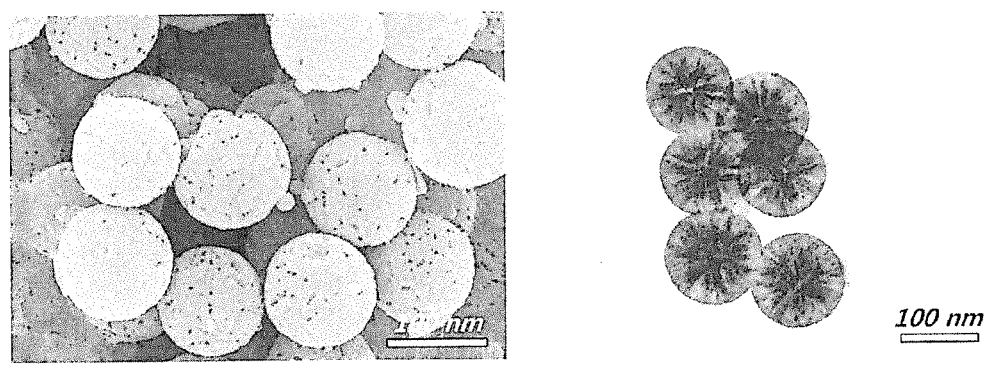
FIG. 3c shows TEM images illustrating the nanostructured hollow silica structures (CTAB-TESPTS-NF) obtained by firing CTAB-TESPTS nanostructures under nitrogen, and selectively removing silica after dipping them into aqueous HF or NaOH solution according to Example 2-(2)

FIG. 3c shows TEM images illustrating the nanostructured hollow silica structures (CTAB-TESPTS-NF) obtained by firing CTAB-TESPTS nanostructures under nitrogen, and selectively removing silica after dipping them into aqueous HF or NaOH solution according to Example 2-(2).

Example 3

Preparation of TESPTS (TESPDS)-Based Composite Nanostructures

To combine TESPTS or TESPDS with octadecyl trimethoxysilane ($C_{18}TMS$), a mixed solution of 5-10 mL of TESPTS or TESPDS with 3 mL of $C_{18}TMS$ is added to a co-solvent solution containing 300 mL of DI water, 100 mL of ethanol and 6 mL of aqueous ammonia (28 wt %). Then, the mixture is agitated for 12 hours. After the agitation, the solid product is recovered by centrifugal separation, and then dried overnight at 343K to obtain $C_{18}TMS$-TESPTS or $C_{18}TMS$-TESPDS composite nanostructures.

Figure 3D:
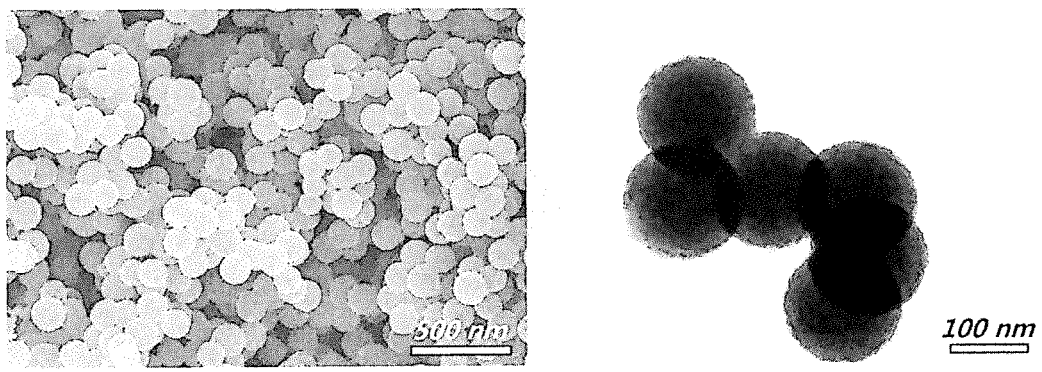
FIG. 3d shows TEM images illustrating the $C_{18}$TMS-TESPTS nanostructures obtained according to Example 3.

FIG. 3d shows TEM images illustrating the $C_{18}TMS$-TESPTS nanostructures obtained according to Example 3.

Example 3-(1)

Preparation of Nanostructured Porous Spherical Silica Particles

The $C_{18}TMS$-TESPTS nanostructures obtained from Example 3 are fired in air at 823K for 6 hours to obtain nanostructured porous spherical silica particles. The resultant porous spherical silica particles will be referred to also as $C_{18}TMS$-TESPTS-A hereinafter.

Figure 3E:
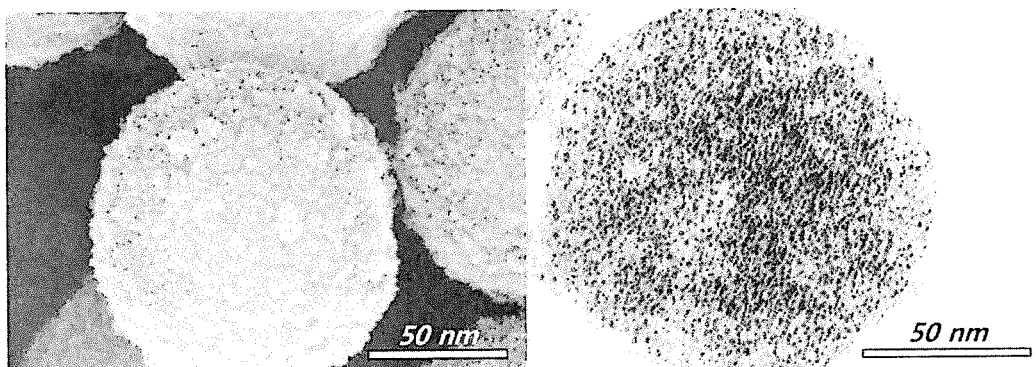
FIG. 3e shows TEM images illustrating the nanostructured porous spherical silica particles ($C_{18}$TMS-TESPTS-A) obtained by firing $C_{18}$TMS-TESPTS nanostructures in air according to Example 3-(1)

FIG. 3e shows TEM images illustrating the nanostructured porous spherical silica particles ($C_{18}TMS$-TESPTS-A) obtained by firing $C_{18}TMS$-TESPTS nanostructures in air according to Example 3-(1).

Example 3-(2)

Preparation of Nanostructured Hollow Carbon Structures

The $C_{18}TMS$-TESPTS nanostructures obtained from Example 3 are fired under nitrogen at 423K for 2 hours and at 1073K for 6 hours to obtain nanostructured hollow carbon/silica composites. Then, silica is removed selectively therefrom by using HF or 2.0M NaOH to obtain nanostructured hollow carbon structures. The resultant nanostructured hollow carbon/silica composites will be referred to also as $C_{18}TMS$-TESPTS-N (fired under nitrogen) and as $C_{18}TMS$-TESPTS-NF (fired under nitrogen and etched with HF or 2.0M NaOH), hereinafter.

Figure 3F:
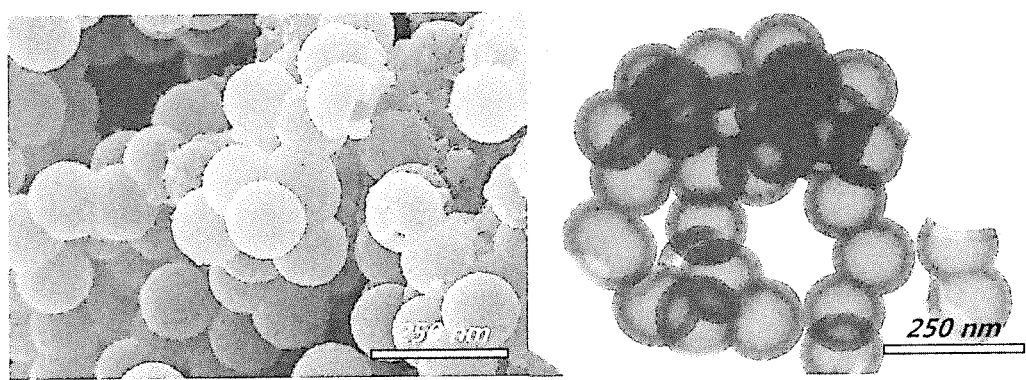
FIG. 3f shows TEM images illustrating the nanostructured hollow carbon structures ($C_{18}$TMS-TESPTS-NF) obtained by firing $C_{18}$TMS-TESPTS nanostructures under nitrogen, and selectively removing silica after dipping them into aqueous HF or NaOH solution obtained according to Example 3-(2)

FIG. 3f shows TEM images illustrating the nanostructured hollow carbon structures ($C_{18}TMS$-TESPTS-NF) obtained by firing $C_{18}TMS$-TESPTS nanostructures under nitrogen, and selectively removing silica after dipping them into aqueous HF or NaOH solution obtained according to Example 3-(2).

Example 4

Preparation of Platinum (Pt) Catalyst Supported on $C_{18}TMS$-TESPTS-NF

A supported Pt catalyst is prepared by using the nanostructured hollow carbon structured obtained from Example 3-(2) as a carrier. The resultant Pt catalyst (60 wt %) is obtained by using ethylene glycol (EG) as a precursor of reductant through a microwave polyol process.

Figure 4A:
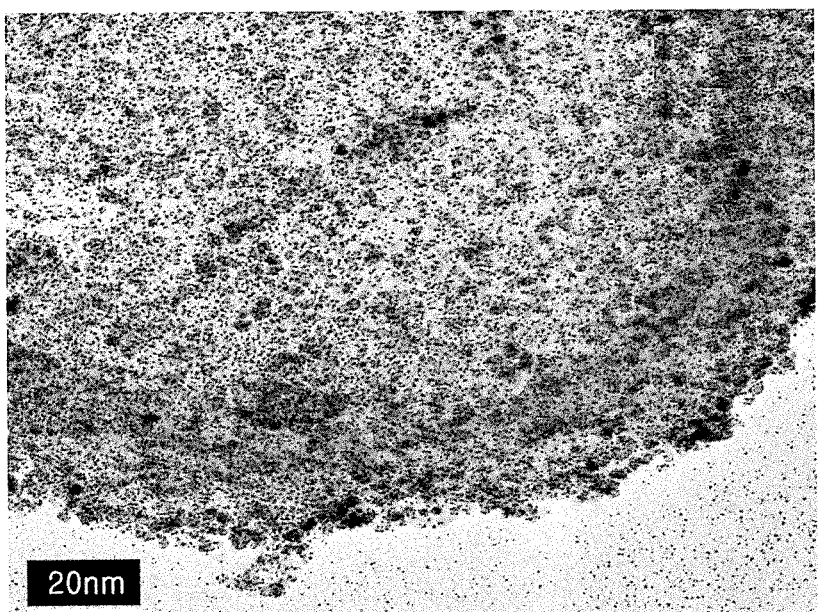
FIG. 4a is a high-resolution transmission electron microscopy (HRTEM) image of a Pt catalyst (60 wt %) supported on nanostructured hollow carbon structures ($C_{18}$TMS-TESPTS-NF)

FIG. 4a is a high-resolution transmission electron microscopy (HRTEM) image of a Pt catalyst (60 wt %) supported on the nanostructured hollow carbon structures ($C_{18}TMS$-TESPTS-NF).

Comparative Example 1

Preparation of Pt Catalyst Supported on Carbon Black (VC)

A Pt (60 wt %) catalyst supported on carbon black (VC) available from Johnson Matthey (J. M.) is used.

Comparative Example 2

Commercially available carbon black (VC) is used as a carrier and Pt metal is supported on the carrier in the same amount (60 wt %) by the same method as Example 4 to obtain a Pt catalyst supported on carbon black (VC).

Figure 4B:
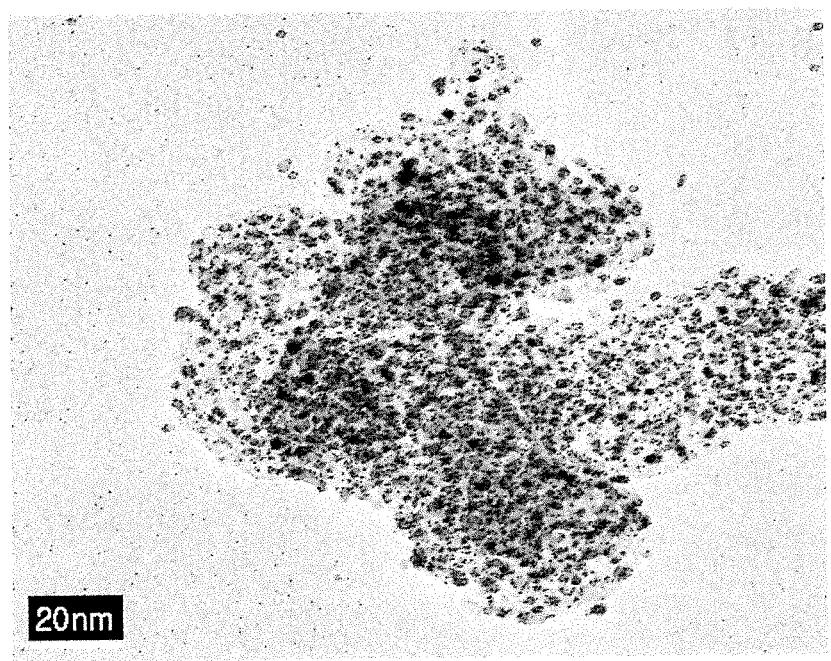
FIG. 4b is an HRTEM image of a Pt catalyst (60 wt %) supported on commercially available carbon black (VC) according to Comparative Example 1 (referred to also as Pt/VC J. M. hereinafter)
Figure 4C:
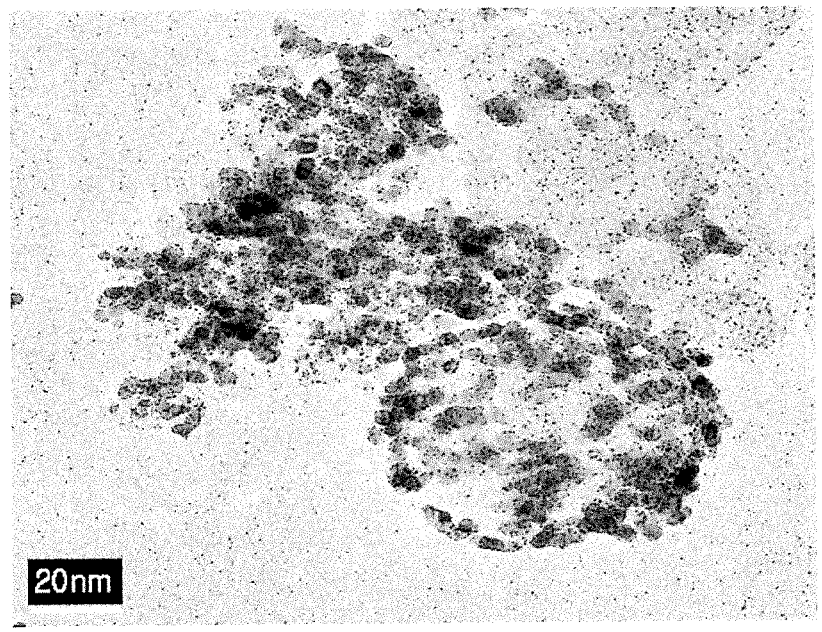
FIG. 4c is an HRTEM image of a Pt catalyst supported on carbon black (VC) according to Comparative Example 2 (referred to also as Pt/VC EG-MW hereinafter)

FIG. 4b is an HRTEM image of a Pt catalyst (60 wt %) supported on commercially available carbon black (VC) according to Comparative Example 1 (referred to also as Pt/VC J. M. hereinafter). FIG. 4c is an HRTEM image of a Pt catalyst supported on carbon black (VC) according to Comparative Example 2 (referred to also as Pt/VC EG-MW hereinafter).

Test Examples (1) Examples 1 to 4, and Comparative Examples 1 and 2 are evaluated by surface characterization and electrochemical experiments.

(2) TEM images are obtained by EM912 Omega electron microscope at an acceleration voltage of 120 kV. Sample powder for use in TEM determination is pulverized by using a mortar. Then, the sample powder is dispersed in ethanol and loaded onto a copper grid having a film of Carbon Type B.

(3) SEM images are obtained by Hitachi S-4700 microscope at an acceleration voltage of 10 kV.

(4) Nitrogen adsorption/desorption isotherms are obtained by KICT SPA-3000S instrument at 67K.

(5) The specific surface area of a sample is determined by a nitrogen adsorption branch in a relative pressure range of 0.05-0.2 by using the Brunauer-Emmett-Teller (BET) equation. The total pore volume of a sample is determined as the amount of gas adsorbed at a relative pressure of 0.99. The pore size distribution (PSD) is calculated from an adsorption branch by the Barrett-Joyner-Halenda (BJH) method.

(6) The powder X-ray diffraction (XRD) pattern of a sample is obtained with Rigaku 1200 diffractometer using, as an X-ray source, Cu Kα radiation generated through a Ni β-filter under the conditions of 40 kV and 20 mA at a rate of 0.2°/min.

(7) FT-IR spectra are obtained with NICOLET FT-IR spectrometer in a transmission mode using compressed KBR pellets. Each IR spectrum is scanned 32 times on average with a resolution of 4 cm$^{-1}$ at a rate of 2 sec/scan. In addition, both $^{29}$Si and $^{13}$C cross polarization (CP) magic angle spin (MAS) NMR spectra are obtained with Bruker DSX-400 spectrometer under the conditions of a 4 mm zirconia rotor, rotation speed of 6 kHz (resonance frequencies of $^{29}$Si and $^{13}$C CP MAS NMR spectra are 79.5 MHz and 100.6 MHz, respectively), 90° pulse at an interval of 5 µs, contact time of 2 ms, and a delay time of 3 s.

(8) The catalysts according to Example 4 and Comparative Examples 1 and 2 are evaluated by using a three-electrode electrochemical cell in terms of electrochemical surface area (ECSA), catalytic activity to oxygen reduction reaction (ORR), and electrochemical stability.

As a working electrode, a Nafion-impregnated catalyst membrane provided on a carbon/glass disc (diameter: 3 mm) inserted into a Teflon cylinder is used. Platinum gauze and Ag/AgCl are used as a counter electrode and a reference electrode, respectively.

The catalyst layer is obtained as follows. First, 5 mg of a Pt/C catalyst is dispersed into 1 mL of a mixed solution of deionized water with ethanol (volume ratio 1:4), and 50 µL of 5 wt % Nafion solution is further mixed therewith. After carrying out ultrasonic vibration for 1 hour, 5 µL of catalyst slurry is taken with a pipette and applied onto the top of the carbon/glass disc in the form of a thin film. Finally, the catalyst-loaded carbon/glass electrode is dried at 80° C. for 1 hour so that the catalyst is loaded in an amount of 63 µg Pt/cm$^2$.

To determine ECSA or catalytic activity to ORR, circulating voltage current (CV) determination is carried out in N$_2$-saturated or O$_2$-saturated 0.5M H$_2$SO$_4$ at a scanning rate of 25 mV/s. To further evaluate the catalytic activities and electrochemical stabilities of various Pt electrodes, steady-state chronoamperometric measurement is carried out in O$_2$-saturated 0.5M H$_2$SO$_4$ at 0.25V.

(9) To evaluate the fuel cell polarization qualities of the Pt/C catalysts according to Example 4 and Comparative Examples 1 and 2, a single cell is provided as follows.

To provide a single cell, 6.25 cm$^2$ of a membrane electrode assembly (MEA) is used, and a pretreated Nafion 112 (DuPont) is inserted between a cathode and an anode by hot pressing. The catalyst is loaded onto the anode in an amount of 0.4 mg Pt/cm$^2$ and onto the cathode in an amount of 0.2 mg Pt/cm$^2$. In all tests carried out in the single cell, commercially available PT (20 wt %)/VC (E-TEK) is used as an anode. Catalyst ink is obtained by dispersing each of the Pt/C catalysts according to Example 4 and Comparative Examples 1 and 2 into a mixed solution containing an adequate amount of deionized water and a desired amount of 5 wt % Nafion ionomer solution (Aldrich). The Nafion ionomer content is 20 wt % on the anode catalyst layer, and 25 wt % on the cathode catalyst layer. After applying an adequate amount of catalyst ink onto teflonized carbon paper (TGPH-090), the catalyst ink is dried at 80° C. overnight. A fuel cell polarization quality test is carried out with WFCTS fuel cell tester at 60° C. in a constant current mode. After carrying out humidification at a temperature of 75° C., H$_2$ and O$_2$ are supplied to the anode and the cathode at a flow rate of 200 mL/min and 500 mL/min, respectively.

Test Example 1

Monodisperse TBOS (1) In an aqueous ethanol solution, TESPTS or TESPDS is used as a source of organic and inorganic ingredients to obtain very homogeneous monodisperse TBOS (FIG. 2). Ethoxysilane (—Si—OC$_2$H$_5$) is hydrolyzed in water to form a silanol group (—Si—OH). Such hydrolysis may be accelerated by hydroxyl ions rather than water molecules. Thus formed silanol group reacts continuously with ethoxysilane or another silanol to liberate ethanol or water, thereby forming a siloxane bond (—Si—O—Si—).

FIG. 2b shows SEM and TEM images of the TBOS spheres, wherein organosilica appears in the form of monodisperse spheres having a diameter of about 350 nm. The low-magnification TEM image (inserted figure in FIG. 2b) shows a uniform size distribution of organosilica spheres. In the $^{13}$C (CP-MAS) NMR of the TBOS spheres, three peaks present in different environments appear as follows (FIG. 2c).

12.5 ppm (carbon atom in Si—*CH$_2$—CH$_2$—CH$_2$—S—S—S—S—CH$_2$—CH$_2$—*CH$_2$—Si)

22.8 ppm (carbon atom in Si—CH$_2$—*CH$_2$—CH$_2$—S—S—S—S—*CH$_2$—CH$_2$—CH$_2$—Si)

41.8 ppm (carbon atom in Si—CH$_2$—CH$_2$—*CH$_2$—S—S—S—S—*CH$_2$—CH$_2$—CH$_2$—Si)

The $^{29}$Si NMR spectrum of the TBOS spheres shows Q site and T site as expected (FIG. 2c). Among the signals in a range of −90 to −150 ppm, the signal at −112.8 ppm and the shoulder at −102.6 ppm are derived from the resonance of Si(OSi)$_4$(Q$^4$) and (OH)Si(OSi)$_3$(Q$^3$), respectively, suggesting that a high degree of crosslinking is made under the given synthetic conditions. The signals derived from silicon bridges made by organogroups may be found in a range of −50 to −90 ppm. The strong resonances at −57.0 ppm and −65.0 ppm correspond to C—Si(OH)(OSi)$_2$(T$^2$) site and C—Si(OSi)$_3$ (T$^3$) site, respectively, suggesting that the organic moieties are stable in the corresponding synthetic conditions and carbon chains are bound successfully to the TBOS spheres.

Figure 2D:
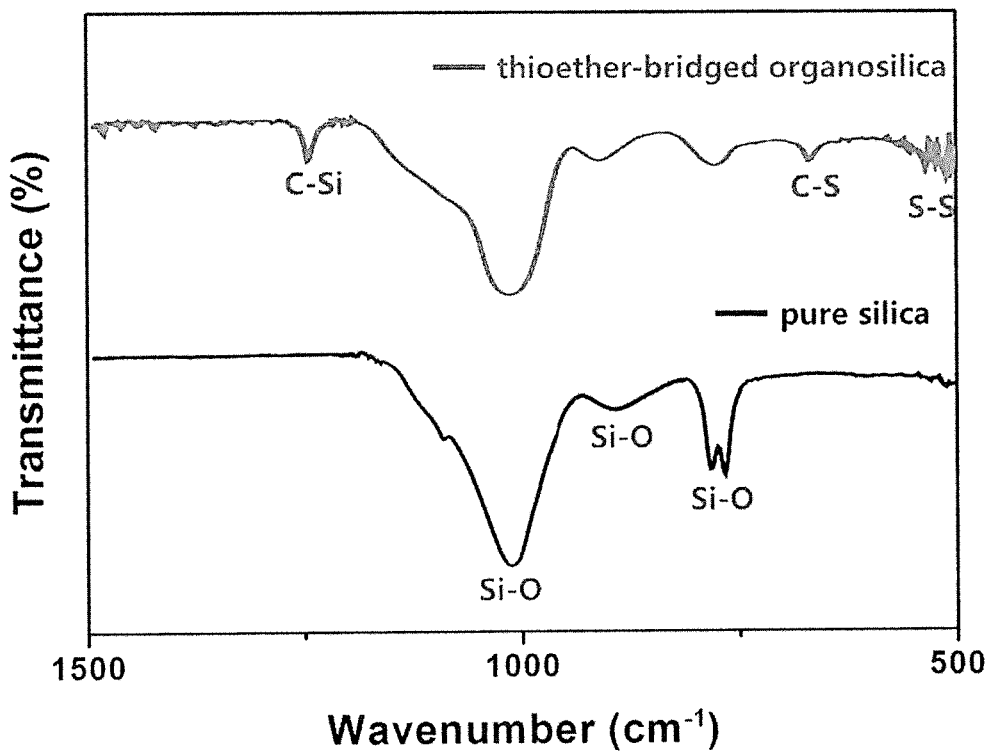
FIG. 2d shows Fourier transform infrared spectroscopy (FT-IR) spectra of pure silica spheres and TBOS according to Example 1.

(2) IR spectra also demonstrate that organic moieties are bound to the TBOS backbone on the basis of C—S and C—Si stretching bands at 698 and 1245 cm$^{-1}$, but these bands are not observed in IR spectrum of "pure" silica. This is because TBOS is obtained by using tetraethyl orthosilicate (TEOS) instead of TESPTS (FIG. 2d). In an organosilica sample, an S—S stretching mode is detected weakly at a wavenumber of 500-540 cm$^{-1}$, probably due to the interruption of strong system noise generated mainly in a detection limit range. In addition, a sharp vibration band at 790 cm$^{-1}$ and broad stretching bands at 890 and 1020 cm$^{-1}$ are also observed due to Si—O bonds. It can be seen from the above IR results that Si—O, C—Si and C—S, S—S bonds are stabilized through the process for preparing TBOS.

Figure 2E:
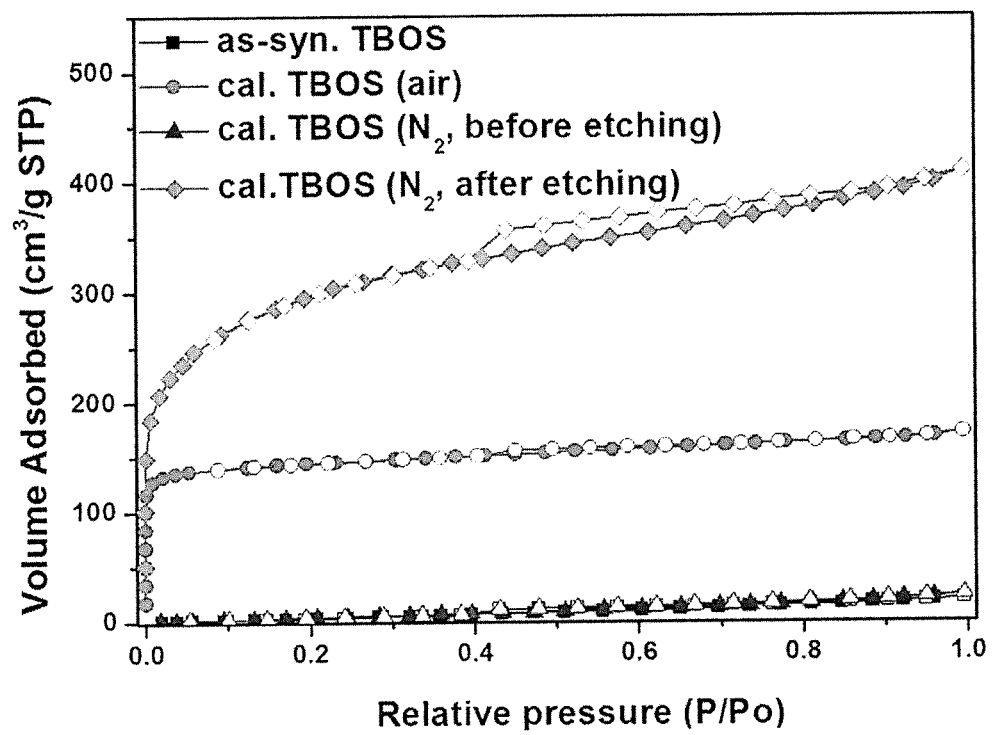
FIG. 2e shows nitrogen adsorption/desorption graphs of TBOS obtained from Example 1, TBOS after firing in air or under nitrogen, and TBOS after firing under nitrogen and etching.

(3) Thus prepared TBOS sample having organic —(CH$_2$)$_3$—S$_4$—(CH$_2$)$_3$— groups are investigated about its surface characteristics, and is shown to have a low surface area of $S_{BET}$<15 m$^2$/g, after calculated from the nitrogen desorption isotherms as depicted in FIG. 2e. This demonstrates that the TBOS particles as they are have a non-porous backbone having little pores and the organic moieties are bound well to the TBOS backbone. When the TBOS sample is fired in air, it shows general surface characteristics as a porous backbone. This results from the removal of organic groups from the backbone. Thus, the sample has a high BET surface area of 210 m²/g. The fired TBOS sample is white-colored representing a silica backbone. Nitrogen desorption of the fired TBOS shows characteristics of type I microporous materials corresponding to the mesoporous backbone as defined by the IUPAC nomenclature.

Meanwhile, when the TBOS spheres are fired under nitrogen, the sample turns into a black color, suggesting that formation of carbon. The organic moiety, (—(CH$_2$)$_3$—S$_4$—(CH$_2$)$_3$—), of TESPTS expected to serve as a porogen during the preparation of TBOS is carbonized under nitrogen flow, thereby forming a carbon backbone. Similarly to the parent of TBOS, the resultant silica/carbon composites have a low surface area of about 23 m²/g. This suggests that the carbon chains are converted quantitatively into the carbon backbone. When the nitrogen-treated silica/carbon composites are further dipped into HF or NaOH solution to remove silica present in the backbone, the resultant silica-free carbon sample has an increased BET surface area of 360 m²/g. Such conversion from organic hydrocarbon into carbon may be accelerated by the sulfide groups present in the lattices. The yield of carbon may be increased significantly through dehydration and sulfonization. This helps acceleration of alkyl group crosslinking and aromatization. The nitrogen desorption of TBOS treated with N$_2$—HF shows characteristics of type I microporous materials corresponding to the mesoporous backbone as defined by the IUPAC nomenclature.

The shape of TBOS spheres is maintained substantially before and after firing in air and under nitrogen. Such an increase in surface area after firing results from the formation of micropores while the organic or inorganic moieties are removed from the strongly bound organosilca structure.

Test Example 2

(1) TESPTS-based or TESPDS-based silica/carbon composites are obtained through an alkali-catalyzed sol-gel process by using not only a backbone precursor but also TESPTS or TESPDS as a structure-directing agent and CTAB or C$_{18}$TMS as a structure-mediating agent. As shown in FIG. 2, CTAB-TESPTS nanostructures and C$_{18}$TMS-TESPTS nanostructures are prepared and they are further treated to obtain high-surface area hollow silica structures or carbon structures, and high-surface area porous spherical silica particles or carbon particles (FIG. 3a to FIG. 3f).

FIG. 3a and FIG. 3d show TEM images of the TESPTS-based composite materials as they are, i.e. CTAB-TESPTS and C$_{18}$TMS-TESPTS particles before heat treatment. Both types of particles of composite materials have a uniform spherical shape with a similar diameter of about 150 nm. The size of the structures may be controlled mainly by reactant concentrations and reaction time.

The same firing treatment in air or under nitrogen as described in Example 1 is also applied to the TESPTS-based materials. In other words, heat treatment in air causes the organic moieties to be removed from the backbone, while silica remains. On the other hand, heat treatment under non-oxidative nitrogen flow and then etching with HF or NaOH causes silica to be removed, while the carbon backbone remains.

The CTAB-TESPTS-A hollow silica structures (FIG. 3b) and C$_{18}$TMS-TESPTS-NF hollow carbon structures (FIG. 3f) obtained in the above manner are shown to have a unique hollow core/shell structure. This is significantly different from the TBOS prepared by using TESPTS or TESPDS alone, since the latter includes silica and a carbon backbone bound tightly to each other and only the micropores remain in the backbone even after carbon or silica is removed.

Meanwhile, the CTAB-TESPTS-NF porous carbon particles (FIG. 3c) and C$_{18}$TMS-TESPTS-NF porous carbon particles (FIG. 3e) have a similar spherical shape but the fired spherical particles have a low density as compared to the corresponding parent particles as they are. As can be seen from the TEM images, porous structures are produced in the backbone because silica or organic moieties are removed due to the firing carried out in a different manner.

Figure 5:
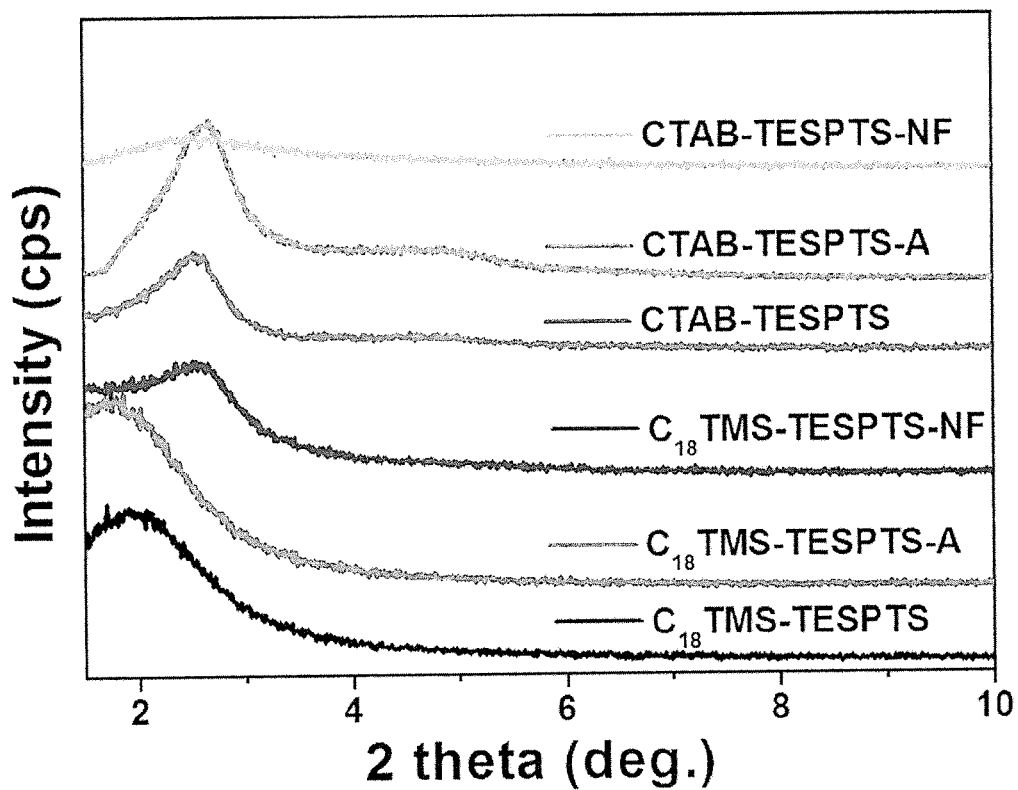
FIG. 5 shows X-ray diffractometry (XRD) pattern graphs of the TESPTS-based nanocomposites obtained from Examples 1 to 3, and various hollow or porous carbon structures and silica structures obtained by firing the nanocomposites.

(2) The structures obtained according to Examples 2 and 3 are determined by XRD and the resultant patterns are shown in FIG. 5. The XRD patterns of the C$_{18}$TMS-TESPTS, C$_{18}$TMS-TESPTS-A and CTAB-TESPTS-NF samples show broad singlets positioned at 2θ=2.0, 1.8 and 2.6°, respectively. This shows amorphous characteristics of the backbones. In addition, the XRD patterns of CTAB-TESPTS, CTAB-TESPTS-A and C$_{18}$TMS-TESPTS-NF show strong main diffraction peaks of (100) at 2θ=2.6, 2.8 and 2.8°, each corresponding to 'd' spaces with 3.67, 3.42 and 3.42 nm fundamental to the symmetry of a hexagonal system. Particularly, the CTAB-TESPTS-A sample show a phase having broad (100) combined with (200), which represents a typical 2D hexagonal structure, in addition to the strong main diffraction peak of (100).

Figure 6:
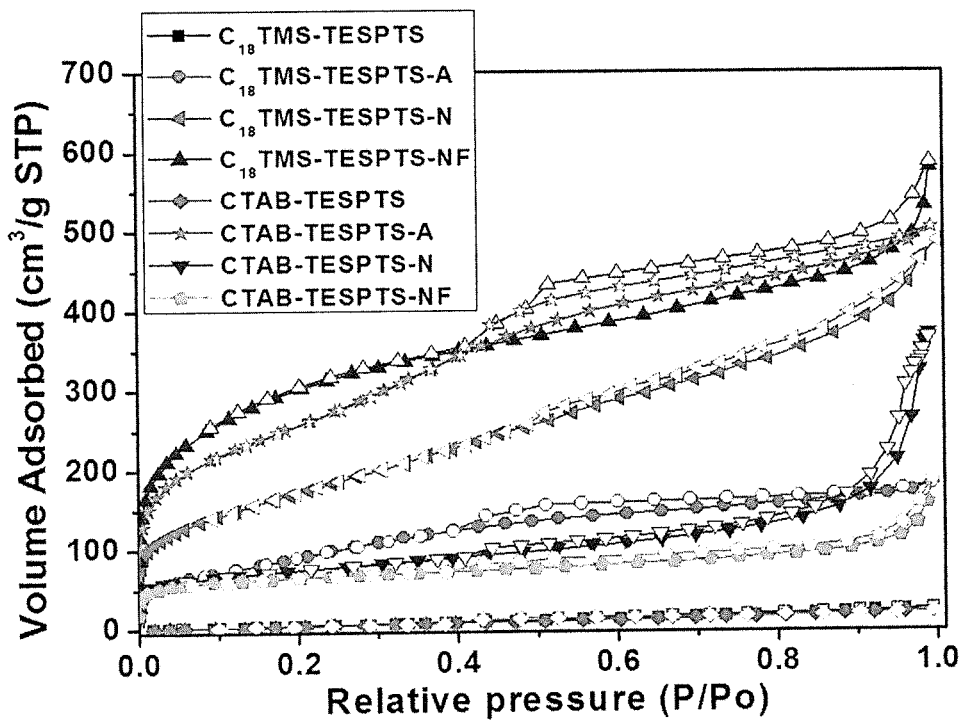
FIG. 6 shows nitrogen adsorption/desorption graphs of the TESPTS-based nanocomposites obtained from Examples 1 to 3, and various hollow or porous carbon structures and silica structures obtained by firing the nanocomposites.

(3) The nitrogen adsorption characteristics of the structures according to Examples 2 and 3 are determined through the nitrogen adsorption/desorption isotherms before and after treatment. The results are shown in FIG. 6. All samples show a type IV isotherm corresponding to the mesoporous backbone as defined by the IUPAC nomenclature. In addition, after calculation, the mesopores have an average size of 3.6-4.7 nm.

In the case of CTAB-TESPTS and C$_{18}$TMS-TESPTS formed by firing under nitrogen, porous silica/carbon composite materials are formed and surface areas are significantly increased as compared to the corresponding parent sample. CTAB-TESPTS and C$_{18}$TMS-TESPTS have a high mesopore volume and have a BET surface area of 964 m²/g and 1070 m²/g, respectively. The structural characteristics of the TESPTS-based nanostructure materials before and after firing are shown in the following Table 1.

TABLE 1

|  |  | $V_{micro}$ (cm³/g) | $V_{meso}$ (cm³/g) | $S_{BET}$ (cm²/g) | PSD$_{micro/meso}$ (nm) |
|---|---|---|---|---|---|
| TBOS | Before firing | 0.01 | 0.04 | 14 | — |
|  | Silica (A) | 0.16 | 0.11 | 210 | 1.1 |
|  | Carbon (NF) | 0.20 | 0.10 | 360 | 0.8 |
| CTAB-TESPS | Before firing | 0.01 | 0.04 | 22 | — |
|  | Silica (A) | 0.35 | 0.61 | 964 | 1.0/3.6 |
|  | Carbon (NF) | 0.08 | 0.10 | 181 | 1.1/3.6 |
| C$_{18}$TMS-TESPTS | Before firing | 0.01 | 0.04 | 18 | — |
|  | Silica (A) | 0.07 | 0.13 | 228 | 1.7/4.7 |
|  | Carbon (NF) | 0.40 | 0.80 | 1070 | 1.1/3.6 |

As shown in Table 1, the hollow carbon structures and porous spherical carbon particles having a hollow core/mesoporous shell have a high surface area and high mesoporous volume, and thus may be used as a catalyst carrier for fuel cells and an electrode material for various electrical devices.

(4) As shown in FIG. 1, in the CTAB-TESPTS or CTAB-TESPDS systems, CTAB as an amphoteric surfactant is hydrolyzed easily in aqueous solution to form single surfactant micelles rapidly, thereby forming a core structure mainly containing CTAB. Meanwhile, TESPTS or TESPDS is assembled around the surfactant micelles to form organosilica spheres. In this manner, core-shell type organic/inorganic composite structures are produced. The organic moieties of the TESPTS molecules are hydrophobic, and thus can be introduced into the micelles. Thus, there is interaction between the hydrophobic organic groups and surfactant. On the other hand, trialkyloxysilyl groups of TESPTS are hydrolyzed and converted into hydrophilic trihydroxysilyl groups, which, in turn, are arranged around the surfactant micelles through the electrostatic interaction with ammonium ions of CTAB. Such interaction between TESPTS and CTAB allows formation of CTAB-TESPTS composite core-shell organosilica nanostructures including a surfactant micelle agglomerate core enriched with carbon at the inner part (core) thereof, and an (outer) shell arranged around the core and mainly containing TESPTS.

In this case, the hydrophobic carbon chains of CTAB are self-assembled repeatedly in a part of TESPTS molecules and core, and the hydrophilic trihydroxysilyl groups of TESPTS are also self-assembled repeatedly around the CTAB micelles through the electrostatic interaction with ammonium ions of CTAB, resulting in growth of the nanostructures. Although TESPTS forms an overlapped (siloxane, —Si—O—Si—) structure during the self-assemblage of a part of silica, the structure cannot be grown any more but is isolated by being surrounded with CTAB micelles hydrolyzed rapidly to form micelles. Meanwhile, when it is difficult to form micelles due to a decrease in CTAB concentration, silica of TESPTS participates in interconnection to form well-developed siloxane structures, so that silica-enriched outer shells are formed around carbon-enriched cores mainly containing CTAB. As a result, core-shell CTAB-TESPTS or CTAB-TESPDS composite structures having carbon-enriched cores based on CTAB and silica-enriched shells formed by overlapping of TESPTS (or TESPDS) are formed. Therefore, when firing is carried out in air, the organic moieties, —$(CH_2)_3$—$S_4$—$(CH_2)_3$— of TESPTS and $CH_3$—$(CH_2)_{15}$— of CTAB are removed to form hollow cores, while silica-enriched shell regions remain. Meanwhile, in the shell regions, mesopores are formed at the sites from which the organic moieties are removed partially, thereby providing hollow mesoporous silica. This conforms to the hollow silica spheres as shown in FIG. 3b. On the contrary, as shown in FIG. 3c, in the case of firing under nitrogen followed by silica etching, the organic moieties present mainly at the cores are carbonized to form carbon and silica is removed partially through etching, thereby forming porous carbon structures.

However, when no surfactant forming a surfactant exists as in the case of $C_{18}$TMS-TESPTS or $C_{18}$TMS-TESPDS organosilica, the situation is reversed. $C_{18}$TMS and trialkoxysilyl groups of TESPTS are hydrolyzed to form highly reactive hydrophilic trihydroxysilyl groups, which, in turn, are assembled with each other through condensation, thereby forming a core-forming material. Meanwhile, the hydrophobic organohydrocarbon functional groups, —$(CH_2)_3$—$S_4$—$(CH_2)_3$— of TESPTS and $CH_3$—$(CH_2)_{17}$— of $C_{18}$TMS have no interaction with each other. Thus, self-assembled silica exists in the outer space of condensed silica structures. As rapid condensation of silica proceeds repeatedly, the structures are grown in size to form structures having silica-based cores and a hydrocarbon-based shells distributed on the outer parts of the cores. Meanwhile, when the condensation reaction rate decreases due to a decrease in concentration of the silica source, the space in which hydrophobic hydrocarbon functional groups are self-assembled at the outer parts increases, and the hydrophobic hydrocarbon functional groups are agglomerated with each other sometimes to form self-assembled structures similar to micelles. Additionally, in response to a decrease in silica condensation reaction rate, organic hydrocarbon groups slightly increases to form carbon-enriched shells. As a result, there are provided inorganic/organic hybrid core-shell-like structures including silica-enriched $C_{18}$TMS-TESPTS agglomerates as core compositions, and hydrocarbon group-enriched outer shells.

As can be seen from the TBOS prepared by using TESPTS or TESPDS alone according to Example 1, TESPTS or TESPDS may function not only as a carbon source but also as a silica source. In the case of $C_{18}$TMS and TESPTS or $C_{18}$TMS and TESPDS, silica species having high reactivity undergoes rapid polymerization first to form cores, while alkyl groups interact with silica-enriched structures to form shells. Therefore, firing under nitrogen followed by silica etching produces hollow carbon structures having mesoporous shells, while firing in air removes hydrocarbon functional groups to produce porous spherical silica particles. This conforms to the TEM images of FIG. 3f and FIG. 3e. Such conversion from organohydrocarbon into carbon may be accelerated by sulfide groups present in lattices. Yield of carbon may be increased significantly through dehydration and sulfonization.

According to the present disclosure, TESPTS or TESPTDS has a function different from the function of CTAB or $C_{18}$TMS as a structural mediator in self-assemblage, so that novel core-shell type organosilica composite materials having silica-enriched regions and carbon-enriched regions in different manners are produced. This cannot be derived from other organosilica mesophases prepared from crosslinked organosilane.

Test Example 3

(1) The $C_{18}$TMS-TESPTS-NF hollow carbon structures disclosed herein are provided in the form of individually independent spherical particles, show a large specific surface area and mesopore volume, and particularly have a three-dimensionally interconnected hollow macroporous core/mesoporous shell nanostructure. Therefore, the hollow carbon structures disclosed herein may be useful as catalyst carriers for active metal nanoparticles.

FIG. 4a to FIG. 4c are HRTEM images of Pt catalysts (60 wt %) supported on the catalyst carriers according to Examples 4 and Comparative Examples 1 and 2. In the case of the $C_{18}$TMS-TESPTS-NF-supported Pt catalyst (FIG. 4a), platinum nanoparticles have a more uniform and smaller size as compared to Comparative Examples 1 and 2. The average particle size of Pt nanoparticles of the $C_{18}$TMS-TESPTS-NF-supported Pt catalyst is about 3.1 nm, which is significantly smaller as compared to the VC-supported catalyst prepared herein (Comparative Example 2, about 4.6 nm) or the catalyst commercially available from Johnson Matthey (Comparative Example 1, about 3.3 nm).

In other words, the carrier disclosed herein, $C_{18}$TMS-TESPTS-NF, has a larger specific surface area and mesopore volume as compared to VC, and thus has a smaller Pt particle size and more uniform particle size distribution.

Figure 7:
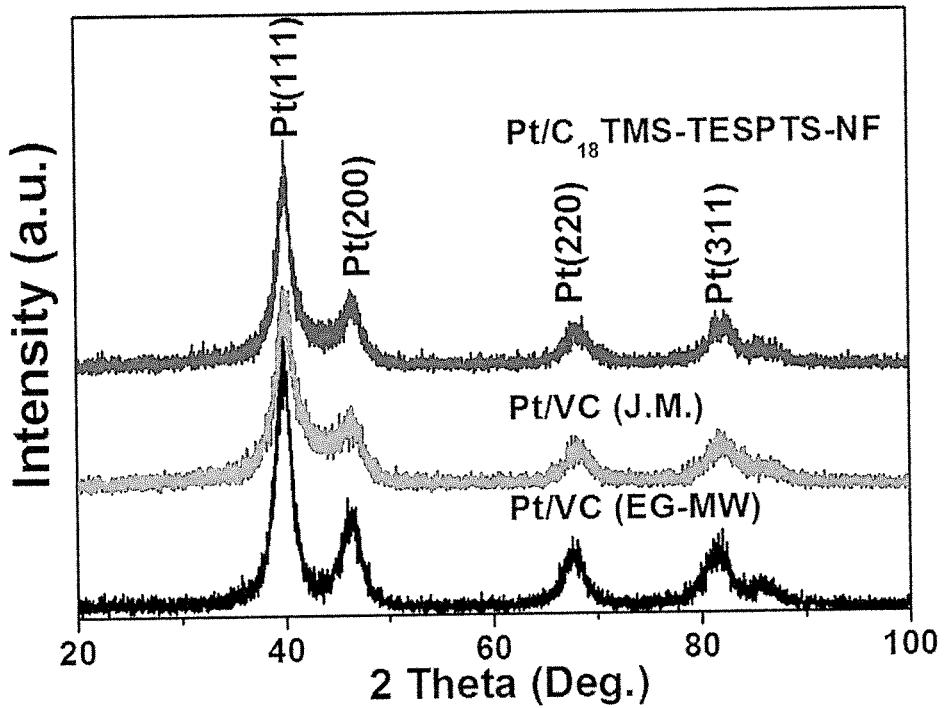
FIG. 7 shows XRD pattern graphs of the Pt-supported catalysts according to Example 4 and Comparative Examples 1 and 2.

(2) FIG. 7 shows typical XRD patterns of the Pt catalysts (60 wt %) according to Example 4 and Comparative Examples 1 and 2.

After carrying out calculation from the patterns, Pt/C$_{18}$TMS-TESPTS-NF (Example 4) has an average particle size of about 3.0 nm, Pt/VC (J. M., Comparative Example 1) has an average particle size of about 3.2 nm, and Pt/VC (EG-MW, Comparative Example 2) has an average particle size of about 4.4 nm. The calculated particle size of the Pt (60 wt %) nanoparticles supported on VC and C$_{18}$TMS-TESPTS-NF conforms to the size measured directly from the HRTEM images.

Test Example 4

Figure 8:
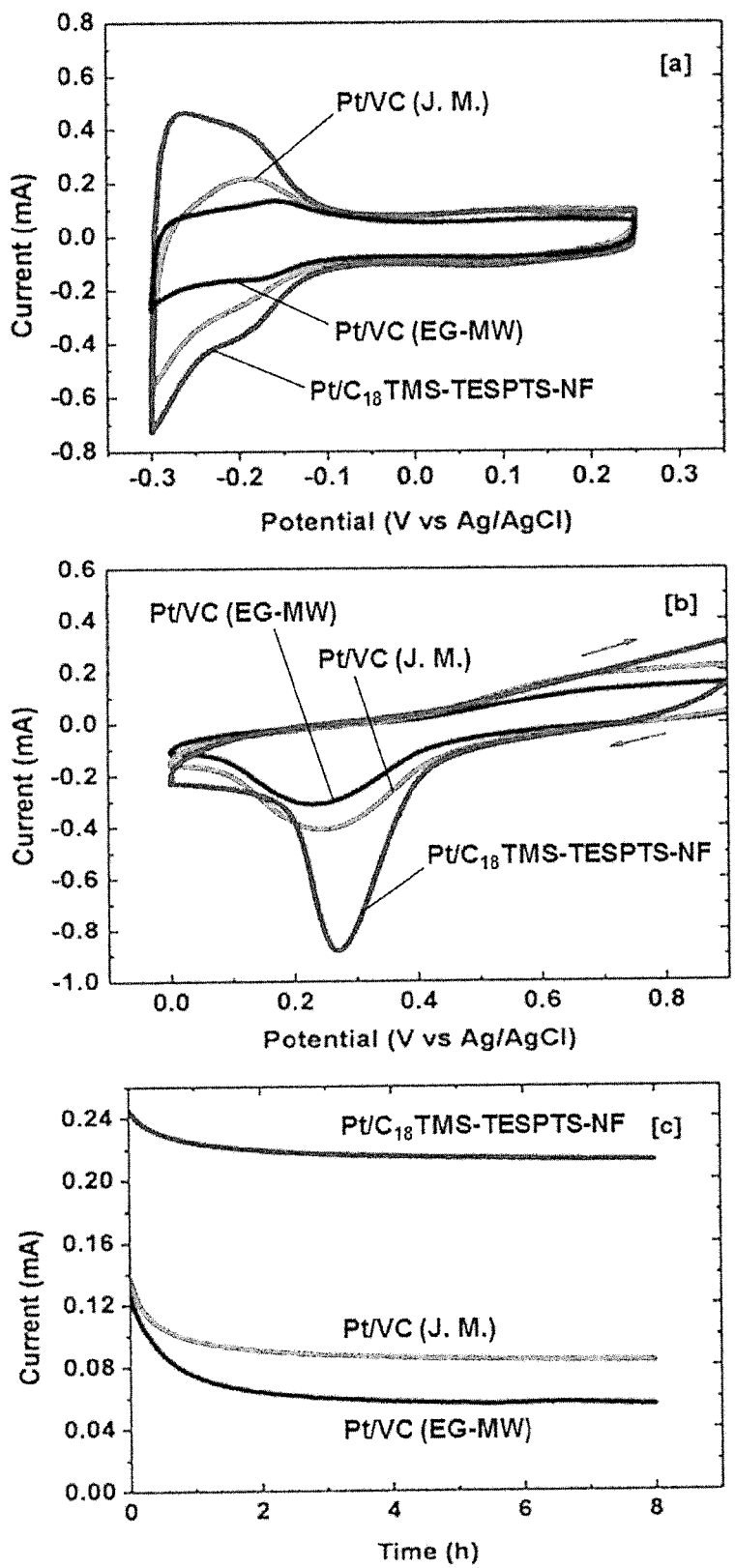
FIG. 8 shows hydrogen electrosorption curves (portion (a)) of the Pt catalysts supported on the carriers of Example 4 and Comparative Examples 1 and 2 in the presence of $N_2$-saturated 0.5M $H_2SO_4$, circulating voltage-current curves (CV) (portion (b)) thereof, and steady-state chronoamperometric curves (portion (c)) thereof in the presence of $O_2$-saturated 0.5M $H_2SO_4$.

(1) FIG. 8 shows hydrogen electrosorption curves (portion (a)) of the Pt catalysts supported on the carriers of Example 4 and Comparative Examples 1 and 2 in the presence of N$_2$-saturated 0.5M H$_2$SO$_4$, circulating voltage-current curves (CV) (portion (b)) thereof, and steady-state chronoamperometric curves (portion (c)) thereof in the presence of O$_2$-saturated 0.5M H$_2$SO$_4$.

(2) From the hydrogen electrosorption curves, electrochemical surface areas (ECSA) are calculated based on a monolayer hydrogen adsorption charge of 0.21 mC/cm$^2$ to polycrystalline Pt, after subtracting the electrical bilayer contribution from the total current response. After carrying out calculation, the C$_{18}$TMS-TESPTS-NF-supported catalyst has an ECSA of 71 m$^2$/g, the VC-supported catalyst has an ECSA of 39 m$^2$/g, and the J. M.-supported catalyst has an ECSA of 54 m$^2$/g. The work efficiency that may be calculated through the ECSA divided by chemical surface area (CSA) is an important parameter in evaluating the characteristics of a catalyst. CSA may be calculated according to the formula of CSA=6000/ρd (ρ: density of Pt, 21.4 g/cm$^3$, d: average diameter of Pt nanoparticles). The C$_{18}$TMS-TESPTS-NF-supported Pt catalyst (60 wt %) has a CSA of 90 m$^2$/g, the VC-supported catalyst has a CSA of 64 m$^2$/g, and the J. M. catalyst has a CSA of 85 m$^2$/g.

After carrying out calculation, the C$_{18}$TMS-TESPTS-NF-supported Pt catalyst (60 wt %) has a work efficiency of about 80%, which is higher as compared to the VC-supported catalyst (VC-supported catalyst 61%, J. M. catalyst 64%). The highest work efficiency of the C$_{18}$TMS-TESPTS-NF-supported Pt catalyst (60 wt %) is derived from the fact that Pt nanoparticles supported on C$_{18}$TMS-TESPTS-NF carbon have a smaller size and more uniform particle size distribution and there is a more efficient mass transfer network around the particles, as compared to Pt nanoparticles supported on VC. It is thought that such high work efficiency contributes to improvement of ORR activity of the corresponding catalyst.

(3) The electrocatalytic activity to oxygen reduction reaction (ORR) of a catalyst is evaluated first from the CV curves observed in O$_2$-saturated 0.5M H$_2$SO$_4$ as shown in portion (b) of FIG. 8. The reduction peak observed at the vicinity of 0.25V (0.27V for the C$_{18}$TMS-TESPTS-NF carbon-supported Pt catalyst) disappears in the electrode from which oxygen is removed. Therefore, the peak is derived from ORR. Clearly, the C$_{18}$TMS-TESPTS-NF carbon-supported Pt catalyst shows higher catalytic activity as compared to the VC-supported catalyst. The peak potential for ORR is about 0.27V in the case of the C$_{18}$TMS-TESPTS-NF carbon-supported Pt catalyst. This is higher than the peak potential (0.25V) of the VC-supported catalyst by about 0.02V, suggesting that the C$_{18}$TMS-TESPTS-NF-supported Pt catalyst having a low over-potential facilitates ORR relatively. The maximum peak currents of the C$_{18}$TMS-TESPTS-NF carbon-supported Pt catalyst, the VC-supported catalyst and the J. M. catalyst are 0.883, 0.311 and 0.410 mA, respectively, each of which corresponds to a mass activity (A$_m$) of 200.2, 70.5 and 93.0 mA/mg$_{Pt}$.

(4) The electrochemical activity to ORR and electrochemical stability are further evaluated by measuring steady-state chronoamperometric curves in the presence of O$_2$-saturated 0.5M H$_2$SO$_4$. As shown in portion (c) of FIG. 8, all of the tested catalysts reach a relatively stable state after a short conversion period.

After 8 hours, the C$_{18}$TMS-TESPTS-NF carbon-supported Pt catalyst shows a final current of about 0.212 mA, which is significantly higher as compared to the VC-supported catalyst (0.055 mA) and J. M. catalyst (0.083 mA).

Figure 9:
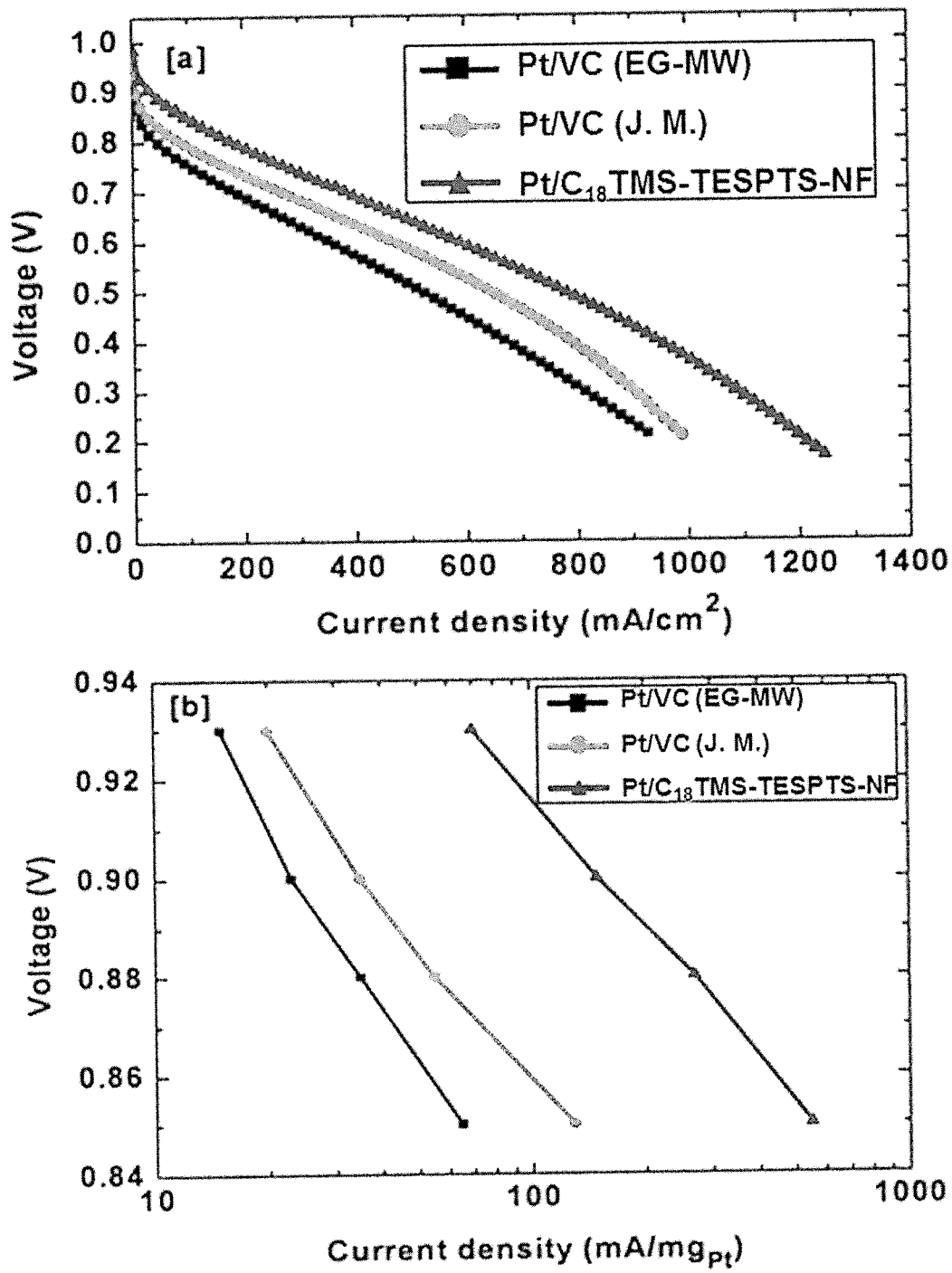
FIG. 9 shows constant-current polarization graphs illustrating the electrocatalytical activities to oxygen reduction reaction (ORR) of the Pt-supported catalysts according to Example 4, and Comparative Examples 1 and 2.

(5) Finally, the electrochemical activities of various carbon-supported Pt catalysts are evaluated by a constant-current polarization test. The results are shown in portion (a) of FIG. 9. As compared to the VC-supported Pt catalyst, the C$_{18}$TMS-TESPTS-NF carbon-supported Pt catalyst shows a higher potential in the whole range of current densities. In addition, as shown in portion (b) of FIG. 9, in terms of Pt mass-based ORR, the C$_{18}$TMS-TESPTS-NF carbon-supported Pt catalyst shows higher activity as compared to the VC-supported Pt catalyst. In portion (b) of FIG. 9, the cell voltage is plotted against the corresponding specific catalytic activity in a voltage range subjected to the control of electrochemical activity in such a manner that the electrode reaction is determined mainly by the ORR rate on the cathode surface. As compared to the VC-supported catalyst, the C$_{18}$TMS-TESPTS-NE carbon-supported Pt catalyst shows a higher potential in a voltage range under activation polarization.

The higher work efficiency and electrochemical activity to ORR obtained from the C$_{18}$TMS-TESPTS-NF carbon-supported Pt catalyst may be caused mainly by the excellent supporting effect of the hollow carbon structures related to the unique porous structure. As compared to carbon black, VC, the C$_{18}$TMS-TESPTS-NF hollow structures have a larger specific surface area and mesopore volume, and thus allow Pt nanoparticles having a smaller particle size to be loaded thereon in a more homogeneously dispersed state. Further, the layered nanostructure having a large hollow macroporous core and a mesoporous shell in addition to a large lattice space formed by three-dimensional interconnection enables rapid mass transfer.

As described above, the TESPTS-based or TESPDS-based organosilica composites disclosed herein are those having both a silica source and a carbon source in their backbones. It is demonstrated that the organosilica composites are multi-purpose precursors suitable for direct structural modification of nanostructured materials. Thus, the organosilca composites provide a route through which nanostructure silica and carbon may be produced directly in a large scale.

Therefore, according to the method disclosed herein, it is possible to produce novel hollow silica and carbon structures having a high concentration of mesopores in a simple and cost-efficient manner. In addition, the hollow carbon structures obtained by the method are shown to have a potential use as catalyst carriers for PEMFC, and thus may be used as catalyst carriers for fuel cells. Further, the silica and carbon structures disclosed herein may be used in various industrial fields, including biology, drug- and substance-release control, catalysts, chromatography, functional membranes for separation, hydrogen storage, dual-membrane storage batteries and electrodes.

While the present disclosure has been described with respect to the specific embodiments, it will be apparent to those skilled in the art that various changes and modifications may be made without departing from the spirit and scope of the disclosure as defined in the following claims.

What is claimed is:

1. A method for preparing hollow carbon structures, comprising the steps of:
   (a) preparing spherical silica-carbon composites including bis(3-triethoxysilylpropyl)tetrasulfide (TESPTS) or bis(3-triethoxysilylpropyl)disulfide (TESPDS) and octadecyltrimethoxy silane ($C_{18}TMS$);
   (b) firing the spherical silica-carbon composites under nitrogen; and
   (c) after firing, selectively removing the silica particles with an etchant solution.

2. The method for preparing hollow carbon structures according to claim 1, wherein the spherical silica-carbon composites are prepared in step (a) by mixing bis(3-triethoxysilylpropyl)tetrasulfide or bis(3-triethoxysilylpropyl)disulfide and octadecyltrimethoxysilane with a co-solvent including water, ethanol and an alkaline additive, followed by agitation.

3. The method for preparing hollow carbon structures according to claim 2, wherein the alkaline additive is aqueous ammonia having a concentration of 20-35 wt % based on the total weight of the mixed solution.

4. The method for preparing hollow carbon structures according to claim 1, wherein the etchant solution is 30-50% aqueous hydrofluoric acid (HF) solution or 1.0-4.0M aqueous NaOH solution.

5. Hollow carbon structures obtained by the method as defined in claim 1, comprising: a porous outer shell having a plurality of micropores and a plurality of mesopores; and a hollow core, wherein the hollow core is a macropore having a diameter of 30-700 nm, the micropores have a diameter of 0.4-2 nm, and the mesopores have a diameter of 2-10 nm.

6. A method for preparing spherical silica particles, comprising the steps of:
   (a) preparing spherical silica-carbon composites including bis(3-triethoxysilylpropyl)tetrasulfide (TESPTS) or bis(3-triethoxysilylpropyl)disulfide (TESPDS) and octadecyltrimethoxysilane ($C_{18}TMS$); and
   (b) firing the spherical silica-carbon composites in air.

7. The method for preparing spherical silica particles according to claim 6, wherein the spherical silica-carbon composites are prepared in step (a) by mixing bis(3-triethoxysilylpropyl)tetrasulfide or bis(3-triethoxy silylpropyl)disulfide and octadecyltrimethoxysilane with a co-solvent including water, ethanol and an alkaline additive, followed by agitation.

8. The method for preparing spherical silica particles according to claim 7, wherein the alkaline additive is aqueous ammonia having a concentration of 20-35 wt % based on the total weight of the mixed solution.

9. Spherical silica particles obtained by the method as defined in claim 6, comprising a plurality of micropores and a plurality of mesopores, wherein the micropores have a diameter of 0.4-2 nm and the mesopores have a diameter of 2-40 nm.

10. A method for preparing spherical carbon particles, comprising the steps of:
   (a) preparing spherical silica-carbon composites including bis(3-triethoxysilylpropyl)tetrasulfide (TESPTS) or bis(3-triethoxysilylpropyl)disulfide (TESPDS) and cetyltrimethylammonium bromide (CTAB);
   (b) firing the spherical silica-carbon composites under nitrogen; and
   (c) after firing, selectively removing the silica particles with an etchant solution.

11. The method for preparing spherical carbon particles according to claim 10, wherein the spherical silica-carbon composites are prepared in step (a) by mixing bis(3-triethoxysilylpropyl)tetrasulfide or bis(3-triethoxysilylpropyl)disulfide and cetyltrimethylammonium bromide with a co-solvent including water, ethanol and an alkaline additive, followed by agitation.

12. The method for preparing spherical carbon particles according to claim 11, wherein the alkaline additive is aqueous ammonia having a concentration of 20-35 wt % based on the total weight of the mixed solution.

13. The method for preparing spherical carbon particles according to claim 10, wherein the etchant solution is 30-50% aqueous hydrofluoric acid (HF) solution or 1.0-4.0M aqueous NaOH solution.

14. Spherical carbon particles obtained by the method as defined in claim 10, comprising a plurality of micropores and a plurality of mesopores, wherein the micropores have a diameter of 0.4-2 nm, and the mesopores have a diameter of 2-40 nm.

15. A method for preparing hollow silica structures, comprising the steps of:
   (a) preparing spherical silica-carbon composites including bis(3-triethoxysilylpropyl)tetrasulfide (TESPTS) or bis(3-triethoxysilylpropyl)disulfide (TESPDS) and cetyltrimethylammonium bromide (CTAB); and
   (b) firing the spherical silica-carbon composites in air.

16. The method for preparing hollow silica structures according to claim 15, wherein the spherical silica-carbon composites are prepared in step (a) by mixing bis(3-triethoxysilylpropyl)tetrasulfide or bis(3-triethoxysilylpropyl)disulfide and cetyltrimethylammonium bromide with a co-solvent including water, ethanol and an alkaline additive, followed by agitation.

17. The method for preparing hollow silica structures according to claim 16, wherein the alkaline additive is aqueous ammonia having a concentration of 20-35 wt % based on the total weight of the mixed solution.

18. Hollow silica structures obtained by the method as defined in claim 15, comprising: a porous outer shell comprising a plurality of micropores and a plurality of mesopores; and a hollow core, wherein the hollow core is a macropore having a diameter of 30-700 nm, the micropores have a diameter of 0.4-2 nm and the mesopores have a diameter of 2-10 nm.

* * * * *